Figure 1:
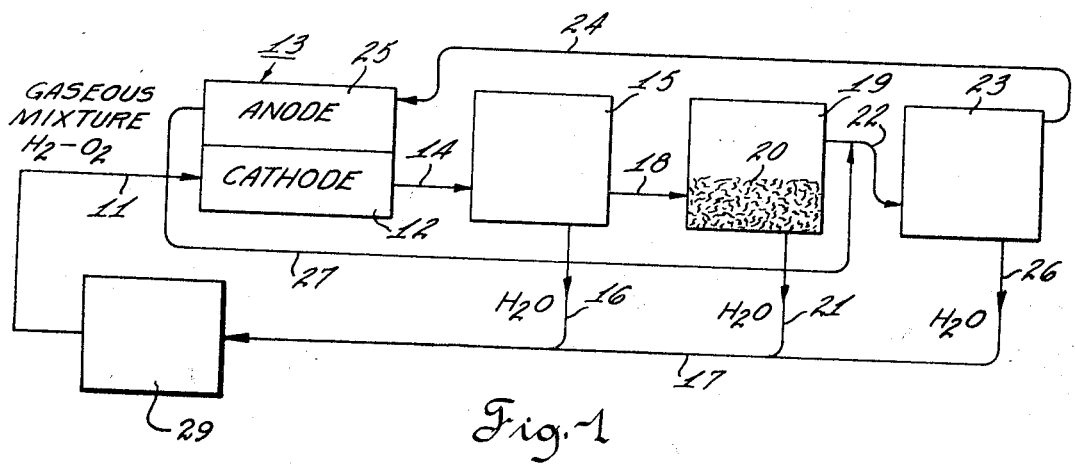

May 27, 1969     J. P. MANION     3,446,673
H₂O₂ FUEL CELL AND METHOD OF PRODUCING ELECTRICAL ENERGY
Filed Aug. 30, 1965

Inventor
Jean P. Manion
By Richard R Mybeck
Attorney

United States Patent Office 3,446,673
Patented May 27, 1969

---

3,446,673
H₂O₂ FUEL CELL AND METHOD OF PRODUCING ELECTRICAL ENERGY
Jean P. Manion, Milwaukee, Wis., assignor to Allis-Chalmers Manufacturing Company, Milwaukee, Wis.
Continuation-in-part of application Ser. No. 198,831, May 31, 1962. This application Aug. 30, 1965, Ser. No. 492,962
Int. Cl. H01m 27/30
U.S. Cl. 136—86                                15 Claims This application is a continuation-in-part of my application S.N. 198,831, filed May 31, 1962, now abandoned.

This invention relates generally to means for and methods of producing power from gaseous mixtures containing hydrogen and oxygen, and more particularly, to the utilization of mixtures of hydrogen and oxygen resulting from the decomposition of water for the electrochemical production of electric power.

The electrochemical production of power has heretofore been known. Common gaseous constituents for the device used such as "fuel cells" have been hydrogen and oxygen. It has heretofore been considered mandatory to maintain absolute independence between the hydrogen feed lines and the oxygen feed lines if an effectively operable cell is to be obtained. For example, the addition of 10 to 20% oxygen to the hydrogen entrance feed line of a conventional hydrogen-oxygen fuel cell on load causes a rapid and significant fall off in both the voltage and the current being delivered by the cell. If the addition of oxygen is continued and especially if the concentration is increased to a concentration of 30% or more, load voltage and current output fall to zero. The same behavior is observed if hydrogen is added in the concentrations indicated to the oxygen (entrance) feed line of the conventional fuel cell.

The present invention is predicated upon my discovery that when a fuel cell and system are constructed according to the teachings herein presented, such independence is no longer necessary and effective fuel cells may be built which operate on a single direct feed line carrying a mixture of hydrogen and oxygen and thereby permit operation directly from gaseous hydrogen-oxygen mixtures such as result from the radiation decomposition of water.

In this manner, considerably more freedom in the selection of possible fuel-oxidant sources is attained.

It is accordingly, a prime object of the present invention to provide means for and method of producing electric power from the gaseous mixture of hydrogen and oxygen such as results from the decomposition of water by radiation, electrolysis or other suitable energy sources.

It is still another prime object of the present invention to provide for fuel cells, an oxidant electrode catalyst which is specific for oxygen and which enables a gaseous mixture of hydrogen and oxygen to be passed directly into the oxidant compartments of hydrogen-oxygen fuel cells.

Another object of the present invention is to provide an oxygen electrode catalyst for use in fuel cells which removes oxygen by absorption from a gaseous mixture of hydrogen and oxygen without removing any hydrogen therefrom.

A still further object of the present invention is to provide a self-purging means for electrochemically producing electrical energy from a gaseous mixture of hydrogen and oxygen.

Still another object of the present invention is to provide a closed-cycle system for utilizing the gaseous mixture resulting from the decomposition of water in a fuel cell to produce electric power and water which in turn is returned to the appropriate source of power, such as radiant energy, for decomposition and forms more of the gaseous mixture.

Figure 2:
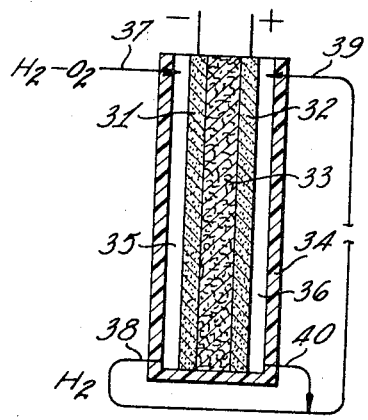
Figure 3:
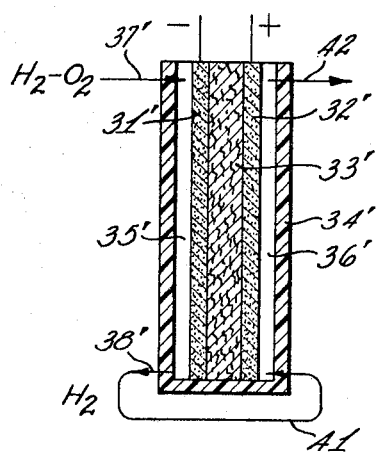

These and still further objects as shall hereinafter appear, are fulfilled by the present invention in a remarkable unexpected fashion as shall be discerned from the following detailed description, especially when read in conjunction with the accompanying drawing in which:

FIG. 1 is a schematic flow sheet of a fuel cell system embodying the present invention;

FIG. 2 is a cross-sectional elevation of an exemplary fuel cell indicating the flow of gas therethrough resulting from the selectivity of the oxygen electrode catalyst upon the gaseous mixture of oxygen and hydrogen in accordance with the present invention; and FIG. 3 is a further illustration similar to FIG. 2 of the means and method of producing electric power according to my invention wherein the auxiliary equipment shown in FIG. 1 is excluded, and the exit gases from the cathode compartment are directed into the anode compartment without any pretreatment.

For ease of description, the present invention will be described in each of its several salient aspects. In order, the catalyst, the electrochemical system, and the relationship the system may assume relative to other energy sources will be described. From this description, other obvious applications of the concepts and insight presented will become apparent but will not be elaborated upon due to their inherent inclusion within the total scope of this contribution.

The catalyst carried upon the cathode is oxygen selective. That is, it activates oxygen to a high degree while leaving little or no effect on the hydrogen present. Unfortunately, most oxygen catalysts are not selective and activate both oxygen and hydrogen so that all of the limiting reactant, be it hydrogen or oxygen, reacts to form water. Experiments I have conducted show that suitable oxygen selective catalysts from a commercial standpoint include the oxides of iron, cobalt, and nickel.

Cobalt oxide is the preferred oxygen selective catalyst because it exhibits practically no activity with respect to hydrogen contained in a gaseous mixture of hydrogen and oxygen, and permits hydrogen to pass over and by it as though hydrogen were an inert constituent in the gaseous mixture.

Cobalt oxide may be formed on an oxygen electrode in any one of a number of quite suitable fashions. I have found, for example, that the cobalt oxide itself may be formed into a paste and spread very thinly upon a supporting matrix such as nickel or graphite or other mechanically strong electrically conductive support means.

Still another method for locating cobalt oxide in its desired position on an oxidant electrode comprises depositing of elemental cobalt onto an electrode base and thereafter oxidizing the cobalt to cobalt oxide.

A preferred method of preparing a cathode with cobalt oxide catalyst comprises impregnating a porous electrically conductive electrode base by immersing the base into a two molar cobalt nitrate solution. Next the impregnated base is dried at about 130° C. A second immersion and drying is usually advantageous.

After the final immersion and drying is completed, the dried base is heated to about 200° C., where it is maintained for about one hour, and then heated to 400° C. where it is held for about two hours. The heating effects the complete conversion of the cobalt nitrate to the catalytically active cobalt oxide surface desired.

The particular manner selected for the formation of the cobalt oxide into an active catalytic area upon an electrode base is of itself unimportant since many methods provide the desired result. The characteristic which is important, however and that which renders my discovery so highly useful, is that when it is employed upon a cathode in an operating fuel cell, cobalt oxide will selectively absorb oxygen from a gaseous mixture containing hydrogen and oxygen without any violation of the hydrogen content in the gaseous mixture.

ELECTROCHEMICAL SYSTEM

The total electrochemical system of the cells being herein described is not unlike a conventional hydrogen-oxygen fuel cell. Structurally, the independent and isolated feed systems of the conventional hydrogen-oxygen fuel cell are eliminated.

Referring to the drawing, the electrochemical system of the present invention calls for the introduction into the cathode compartments of the fuel cells of a gaseous mixture of hydrogen and oxygen, from a source 29, examples of which will be hereinafter described in more detail. The mixture is fed unseparated from source 29 through a line 11 directly to the cathode 12 of a suitable gas fuel cell 13. The cathode 12 is an electrode having an oxygen specific catalyst such as cobalt oxide disposed thereon.

The exit gases from the cathode 12 are conducted via line 14 into a water trap 15 where such water is removed as may have been entrained in the gas stream as it passed through and out of the cathode 12. Water removed from the gas stream by trap 15 is passed via line 16 to a suitable drain line 17. The relatively dehydrated gas stream passing from trap 15 is then fed via line 18 into an oxygen trap 19. Such oxygen as may remain in the hydrogen stream is captured by the oxygen trap 19 on suitable particles 20, such for example, as particles of platinum or palladium, and converted to water by reaction with some of the hydrogen in the stream. The water formed is passed through line 21 to drain line 17.

At this point it should be noted that if the initial gaseous mixture containing hydrogen and oxygen is produced by the decomposition of water, regardless of the energy source effecting the decomposition, no change in overall closed cycle material balance occurs as long as the sole reaction product of the hydrogen and oxygen is water.

Thus, the "disappearance" of oxygen by electrochemical reaction on the oxygen selective catalyst surface of the cathode is accompanied by the "disappearance" of an equivalent stoichiometric amount of hydrogen at the anode. The product of the overall cell reaction is electric power and the formation of water.

Further, while it has been indicated that the oxygen selective catalyst is very effective in removing oxygen from the gaseous mixture during operation of the cell, and with an appropriately adjusted flow rate and a sufficient catalyst surface will remove substantially all of it, (the oxygen trap is desirable as a safeguard) to insure that even the last traces of oxygen are removed from the gas stream prior to its introduction into the anode compartments.

The action of the oxygen trap in removing such traces of the oxygen as may be present in the gas stream as it exits from the last cathode compartment will, of course, result in the removal of a stoichiometric equivalent of hydrogen from the stream to combine with the oxygen and form water.

The oxygen-free hydrogen is fed from oxygen trap 19 via line 22 into a second water trap 23 which, with respect to the main stream, is more in the nature of safeguard than a requirement. The dehydrated hydrogen stream is then directed via line 24 into the anode 25 of the fuel cell 13 while any water that may have collected in the trap 23 is directed via line 26 into drain line 17.

It has been found convenient to pass the hydrogen gas exiting from anode 25 via line 27 back into water trap 23 for recycling through line 24. In this instance, trap 23 functions to remove entrained water from the hydrogen stream and maintains a proper water balance in the anode compartment.

The water discharging from each of the several traps is shown as entering the same drain line 17 although, if desired, the discharging water may be fed into separate lines. The water may then be either disposed of or, in the closed cycle system utilized in the special generator arrangement hereinafter described.

Looking at the cell in FIG. 2, cathode 31 and the anode 32 are assembled in a sandwich arrangement about an asbestos spacer 33 which, in the specific cell illustrated is saturated with a suitable electrolyte such, for example, as 25% KOH.

The complete arrangement is disposed within a housing 34 in such a manner as to provide an oxidant space 35 and a fuel space 36 in accordance with conventional fuel cell practice.

An important difference exists between the illustrated cell and a conventional hydrogen-oxygen fuel cell; namely, a conventional cell absolutely requires that the fuel and the oxidant fed thereto be segregated and remain completely independent of each other. The present cell, however, permits the fuel and the oxidant to be integrated. Thus, the mixture containing both hydrogen and oxygen is deliberately introduced through inlet 37 into the oxidant space 35. Thus, the present cell permits utilization of the gaseous products of decomposition of water without requiring exacting separation or maintenance in segregated condition.

When the system is operating, the gas mixture enters the cell through inlet 37 and engages the oxygen specific catalyst disposed on the cathode 31 which selectively removes, by absorption, oxygen from the mixture. The gas stream leaving the oxidant space 25 via exit 38 is thus mostly hydrogen. This gas stream is then passed through a system of traps, not shown but already described, which are located at the break shown in the line 38. The dry dehydrated gas stream is then fed into the fuel compartment 36 through inlet 39. The exit stream 40 from the fuel compartment 36 is essentially unreacted hydrogen and water in varying amounts, depending on the load and is returned to a water trap for further dehydration.

Clearly to one skilled in the art, product water can form either at the cathode or anode of a $H_2/O_2$ fuel cell depending upon the pH of the electrolyte. Referring to FIG. 1, when the system shown is operated with a basic fuel cell electrolyte, water trap 15 only serves to remove water that incidentally may have become entrained in the $H_2/O_2$ gas stream. Water trap 23 handles the removal of the water produced at the anode 25 of cell 13. The roles of the water traps are, of course, reversed when using an acid electrolyte. But regardless of the electrolyte used, the omission of water traps 19 and 23 will only affect the duration of efficient operation. Furthermore if oxygen trap 23 is omitted from the system shown in FIG. 1, it is apparent that whatever oxygen is not utilized at cathode 12 and remains in the gas stream reaching anode 25 may and probably will react with hydrogen directly on the anode catalyst surface. But the gas stream at this point is nearly depleted in oxygen content because of the electrochemical reaction of oxygen at oxygen selective cathode 12. Therefore, whatever additional water is produced by the direct reaction of hydrogen and oxygen at anode 25 only poses an additional water removal problem. This problem again affecting only the efficiency of my invention can be solved by means beyond the scope of the present invention.

Indeed, reference to FIG. 3 which has been included to show pictorially what has been previously set forth graphically will make plain that the auxiliary equipment is optional.

In FIG. 3, a cell similar to that shown in FIG. 2 is supplied with a $H_2/O_2$ gas stream via line 37' to its cathode compartment 35'. At least part of the oxygen reacts electrochemically at cathode 31'. The unreacted gases are removed from compartment 35' via line 41 and directed without further treatment into anode compartment 36'. There, at least, part of the hydrogen remaining in the now oxygen depleted gas stream reacts electrochemically at anode 32'. The unreacted gases and any waste products are removed from compartment 36' via line 42.

The half-cell reactions between the fuel and oxidant at the electrolyte interface and the resulting passage of electrons through an external circuit as electric power for hydrogen-oxygen fuel cells, is well known, having been thoroughly documented both in the literature and in the patent art, and does not require a detailed explanation here.

The system herein described is especially unique in that it is adept in the utilization of nuclear radiation energy. The radiation products of water, for example, can be used without the separation step that would be required in a conventional $H_2/O_2$ fuel cell. In the early practice of the invention, a module was formed of eight fuel cells in which each of the several cathodes carried a cobalt oxide catalyst and each of the several anodes carried a conventional platinum-palladium catalyst. The electrodes utilized were generally rectangular, although of course, any suitable configuration may be used without departing from the concepts hereof. The asbestos spacer sandwiched between adjacent electrodes was of a complementary shape and was saturated with 25% KOH.

In operation, the hydrogen-oxygen mixture was produced by the electrolysis of a preestablished water supply. Once on stream, drain line water was recycled to the electrolysis cell to supplement the water supply. A hood over the electrolysis cell captured the gaseous products of decomposition as they were formed and automatically integrated them.

When a number of cells are employed, the mixture is passed serially through each of the several cathode compartments and then dewatered before being passed serially through each of the several anode compartments.

In this connection gas mixture feed rate and power demand on the fuel cells determine the number of oxidant compartments connected in series that are required to reduce the $O_2$ concentration to a given level. In any case, the last fuel cells connected in series operate at considerably reduced electrical output due to the low percentage of oxygen in the gas mixture entering the oxidant compartments. In practice, it has been found convenient to lower $O_2$ concentration to approximately 8% and to remove the remaining 8% in the $O_2$ trap.

In operating the module, the eight cells were connected electrically in series and a steady state operation of 0.30 amp. at 7.5 volts was obtained. The exit gases from the final oxidant space were fed through a water trap, an oxygen trap, (catalytic recombiner) and another water trap. The dry, oxygen-free hydrogen gas is then fed into the fuel space of the several anodes, also connected in series with respect to $H_2$ gas flow. The fuel cell system was then operated entirely on the gas mixture generated by electrolysis to simulate radiation decomposition of water. The exit water from the several traps was returned to the electrolysis cell. In this manner, a closed cycle system having long term operation with a stable electrical output was achieved. The desirable applications of such a system to space flight and similar long term ventures powered by nuclear radiation is obvious.

In the oxygen trap, a suitable water removal means comprising small pieces of porous nickel coated with platinum, palladium, or other noble metals, is excellent in achieving the desired result. These catalytically coated chips are packed into a small container which preferably is provided with outer jacket which permits the circulation of cooling air or $H_2O$ to maintain the catalyst surface at a temperature warm enough to evaporate water therefrom but within such temperature limits as to maintain the hydrogen-oxygen reaction at a controllable rate. If the load on the cells drops (so that oxygen to be removed in the trap increases), the amount of water being formed in the trap will increase; but, unless the heat of the trap is sufficient to evaporate this water, water will condense on the catalyst surface of the chips and choke off the effectiveness of the trap. While the heat evolved by the reaction of hydrogen and oxygen normally is more than enough, so that a coolant is used, if coolant flow rate is too great, condensation will occur and oxygen removal will be impaired. Since oxygen in the anode should be avoided, the occurrence of water on the chips in the oxygen trap should be countered by a reduction of the flow of the trap coolant whereby the effective temperature of the trap is restored to its proper level and the extraneous water is vaporized.

The temperature limits for the catalyst are quite large. Only when the temperature of the catalyst surface is permitted to go beyond 600° C. or fall below the evaporation temperature of water does any significant problem arise.

To further aid in the understanding of the present invention, and not by way of limitation, the following examples are presented:

Example I

Two fuel cells, each containing anodes formed of 0.028 inch thick porous nickel electrode bases (approximately 3" x 3") upon which was disposed 25 mg. of palladium per square inch and 5 mg. of platinum per square inch of electrode surface; cathodes formed of 0.095 inch thick porous nickel electrode bases (approximately 3" x 3") upon which was disposed 100-170 grams of cobalt oxide per square inch of electrode surface; and asbestos spacers (approximately 3" x 3") were connected in series electrically.

For start-up, pending equilibration of the system, an ignition charge of cylinder hydrogen was fed into the anode compartments, while a mixture obtained by blending gaseous hydrogen and oxygen formed by the electrolysis of water, was fed into the cathode compartments. Apparent to one skilled in the art is the fact that if an oxygen trap is used some means must be used when first starting the cell to initiate the electrochemical removal of oxygen at the cathode. Otherwise, there is too much direct nonelectrochemical reaction within the oxygen trap with the danger of exhausting the gas stream of hydrogen fuel before reaching the anode. To overcome this problem, a means to initiate the oxygen half-cell is used such as supplying hydrogen to the anode or treating it as a dummy electrode. Once the cell is in operation, use of this means can be discontinued. After a few minutes of operation, the exit stream of the cathode compartments was connected through the trap system to the anode compartments and the cylinder hydrogen was disconnected. Thereafter, the decomposition of the return water in the electrolysis cell provided further gaseous hydrogen and oxygen which were admixed and fed to the cathode compartments. In this fashion, closed cycle operation was obtained.

The results obtained while the cells operated on cylinder hydrogen are reported in Table I. The flow rate of the gas mixture to the cathode compartments was 72 cc. per minute. The results obtained while the cell operated solely on the gas mixture in closed cycle are reported in Table II. In the later instance, hydrogen from the anode compartments was recycled, as shown in FIG. 1, to remove water from the system.

TABLE I

| Cell I | | Cell II | | Time |
|---|---|---|---|---|
| E (volts) | i (milliamps) | E (volts) | i (milliamps) | (minutes) |
| 1.02 | 0 | 1.02 | 0 | 0 |
| 0.65 | 1,000 | 0.67 | 1,400 | 15 |
| 0.64 | 990 | 0.67 | 1,390 | 30 |
| 0.62 | 950 | 0.66 | 1,375 | 60 |

TABLE II

| Cell I | | Cell II | | Time |
|---|---|---|---|---|
| Volts | Milliamps | Volts | Milliamps | (minutes) |
| 0.64 | 940 | 0.67 | 1,390 | 10 |
| 0.64 | 925 | 0.66 | 1,360 | 30 |
| 0.61 | 900 | 0.64 | 1,320 | 90 |
| 0.60 | 880 | 0.63 | 1,300 | 120 |
| 0.60 | 860 | 0.62 | 1,290 | 180 |
| 0.58 | 830 | 0.61 | 1,270 | 210 |
| 0.58 | 800 | 0.60 | 1,250 | 270 |
| 0.58 | 800 | 0.60 | 1,250 | 300 |

For purposes of comparison, the cells of Example 1 were operated conventionally, that is, cylinder oxygen (100%) was fed into the cathode compartments and cylinder hydrogen was fed into the anode compartments. The electrical characteristics of the cells during this conventional operation are reported in Table III.

TABLE III

| Voltage | | Current(ma.) | | Time |
|---|---|---|---|---|
| I | II | I | II | (minutes) |
| 1.04 | 1.04 | 0 | 0 | 0 |
| 0.70 | 0.70 | 1,200 | 1,600 | 10 |
| 0.70 | 0.70 | 1,080 | 1,550 | 30 |
| 0.70 | 0.70 | 1,080 | 1,550 | 09 |

From the foregoing it is seen that Cell II, which consistently possessed the better electrical characteristics, delivered 1550 milliamperes at 0.70 volt for 90 minutes while operating on cylinder hydrogen and 100% oxygen. When the gaseous mixture (33.3% oxygen) Table I, was introduced into the cathode compartments, relative consistant readings of 1400 ma. at 0.67 volt and 1375 ma. at 0.66 volt were obtained over a one hour period. The lower values are consistent with operation at the lower $O_2$ content of the oxidant half-cell. Fuel cells operating on air (20% $O_2$) show a similar decrease in voltage-current output.

For closed cycle operation, Table II, the cell drifted only slightly from 1390 ma. at 0.67 volt initially to 1250 ma. at 0.60 volt at the end of five hours of continuous operation.

Analysis of the gas stream at various points in the system is reported in Table IV and shows that the initial gas mixture, produced in the electrolysis chamber, is essentially stoichiometric (65–66% $H_2$, 33–34% $O_2$) and quite reproducible. Gas analysis was performed by gas chromatography. For gas analysis, the cells were operated with a constant mixture flow rate of 72 cc. per minute. The current at the gas generator was 5.0 amps.

As expected from my teaching, a fall off in oxygen concentration is observed when the gas stream is analyzed after leaving the cathode compartment. The greater fall off (33% to 20%) occurs at the larger fuel cell current load as expected from my teaching.

A sampling of the gas stream after leaving the oxygen trap (catalytic recombiner) shows that when the cells are operated at the heavier load, the hydrogen stream is completely free of oxygen. The lower load, for the reason already explained, inadvertently permitted a residual oxygen content of 5%. This would have been overcome by increasing the temperature in the oxygen trap (reducing the flow of coolant) so that the water forming is prevented from collecting on the catalyst and blocking its effectiveness.

The data from Tables II and IV, including the gas flow rate from the generator, the mixture composition from the generator and the fuel cell current load may be used to calculate the expected composition of the gas stream leaving the cathode compartments. The results of the comparison are reported in Table V. A four electron change was assumed per mole of oxygen consumed in the oxidant half-cell reaction.

TABLE IV

| | Percent $H_2$ | Percent $O_2$ | Percent N |
|---|---|---|---|
| Generated | 65.8 | 33.4 | 0.8 |
| Do | 65.0 | 33.8 | 1.0 |
| Cathode exit | 77.1 | 21.9 | 0.8 |
| Do | 70.4 | 28.6 | 0.8 |
| Anode enter | 100 | 0 | 0 |

TABLE V

| | 2.45 ampere load (I and II) | | 1.225 ampere load (I and II) | |
|---|---|---|---|---|
| | Calc'd | Obs. | Calc'd | Obs. |
| $O_2$ | 23.4 | 21.9 | 28.8 | 28.6 |
| $H_2$ | 75.7 | 77.1 | 70.4 | 70.4 |
| $N_2$ | 0.9 | 0.8 | 0.85 | 0.8 |

RELATIONSHIP TO OTHER ENERGY SOURCES

Other sources or energy for the decomposition of water to provide the desired output for my gas generator are readily available. For example, an excellent mixture results from the radiation decomposition of water with radioactive materials such as cobalt 60, strontium 90, polonium 209, polonium 210 and like materials.

The use of reactor fission products is also advantageous because it, in effect, provides the needed energy at no cost. As is known, nuclear reactors produce electric power by the degradation of fission energy to thermal energy followed by the conversion of the thermal energy into electrical energy through a conventional steam turbine-generator arrangement. The reactor fission by-products are disposed of with no effort being made to exploit the residual energy retained therein. The present invention is thus especially adapted to convert this wasted energy into useful electric power by utilizing the energy to decompose water into a gaseous mixture which contains both hydrogen and oxygen and converting this mixture in its integrated form into electric power in the manner already described.

Another excellent source of energy for decomposition is provided by a nuclear reactor. The reactor provides a high level radiation source equal to and exceeding the radiation levels obtained by the previously identified radioactive materials. Thus, the fission recoil decomposition of water in a homogeneous reactor, in which 168 mev. or 84% of total energy appears as energy of the recoil fragments, is an especially suitable source of the gas mixture herein employed. For example, the homogeneous reaction operated at Oak Ridge, Tenn., was found to produce 20,000 liters (S.T.P.) per hour of hydrogen-oxygen stoichiometric mixtures per megawatt of reactor thermal power. (See: Proceedings of the Second United Nations International Conference On Peaceful Uses of Atomic Energy, volume 7, pages 5–6, 1958.)

Another reactor which is nonhomogeneous but which is suitable for use in the practice of the present invention is one in which the fuel is in the form of enriched uranium glass fibers on enriched uranium dioxide powder. These fuel forms permit the attainment of reactor criticality and, at the same time, permit intimate contact between the fissionable material and the chemical reactant necessary for an efficient transfer of radiation energy. In the present case, the chemical reactant will be water which will be decomposed to form the desired integrated hydrogen-oxygen gaseous mixture.

From the foregoing it becomes apparent that improved means for and methods of producing electric power from gaseous decomposition products have been herein described and illustrated which fulfill all of the aforestated objectives to a remarkably unexpected extent.

It is, of course, understood that the examples and embodiments herein described and illustrated are intended to be exemplary only and are not presented as limiting on the present invention. Further such modifications, applications and alterations as readily occur to the skilled artisan when confronted with this disclosure are intended within the spirit hereof, especially as defined by the scope of the claims appended hereto.

The embodiments of the invention in which an exclusive property or privilege is claimed are defined as follows:

1. A system for producing electric power comprising: a source of an integrated gaseous mixture consisting of hydrogen and oxygen; a fuel cell having a catalyst activated cathode and anode, said cathode carrying an oxygen selective catalyst; means for startup of said said cell; means for directing said integrated gaseous mixture from said source into said fuel cell for engagement with said cathode whereupon oxygen is absorbed and hydrogen is rejected by said catalyst; means for withdrawing said mixture from engagement with said cathode and dehydrating said mixture; means for removing substantially all oxygen from said mixture and leaving a hydrogen stream, and means for directing said hydrogen stream into engagement with said anode.

2. A system according to claim 1 in which said oxygen selective catalyst is cobalt oxide.

3. In a system for producing electric power, means for electrochemically converting an integrated gaseous mixture of hydrogen fuel and oxygen oxidant into electric power comprising: a fuel cell having a housing, a cathode, an anode, and a spacer impregnated with electrolyte operatively interposed between said cathode and said anode, said cathode carrying an oxygen selective catalyst, said cathode and anode being spaced from said housing and respectively defining therewith a cathode compartment and an anode compartment; means for startup of said cell; means for feeding said integrated mixture into engagement with said cathode in said cathode compartment where at least a portion of oxygen in said mixture is absorbed therefrom; means for directing said oxygen-reduced mixture from said cathode compartment through a catalytic recombiner means for removing substantially all of the oxygen remaining in said mixture therefrom; means for directing said oxygen-free mixture from said catalytic recombiner means into engagement with said anode for electrochemical reaction with said oxygen absorbed on said cathode to produce electric power.

4. A system according to claim 3 in which said oxygen selective catalyst is cobalt oxide.

5. A system for producing electric power comprising an energy source; a water source; means for applying said energy source for decomposing said water into an integrated gaseous mixture of hydrogen fuel and oxygen oxidant; a fuel cell having a cathode and an anode compartment; a cathode disposed in said cathode compartment and having an oxygen selective catalytically active area disposed thereon; an anode disposed in said anode compartment; an electrolyte-bearing spacer interposed between said anode and said cathode in intimate engagement therewith; and means for passing said integrated gaseous mixture first through said cathode compartment where substantially all of the oxygen in said integrated gaseous mixture reacts and subsequently passing the remainder of said integrated gaseous mixture through said anode compartment where said hydrogen reacts.

6. A system according to claim 5 in which said catalytically active area consists essentially of cobalt oxide.

7. A system according to claim 5 in which the water produced in the fuel cell is collected and returned to said water source.

8. A process for the electrochemical conversion of a gas stream consisting of a mixture of hydrogen fuel and oxygen oxidant into electrical energy comprising the steps of passing said gas stream into the cathode compartment of a fuel cell; circulating said gas stream over the fuel cell cathode, said cathode having an oxygen selective catalyst selectively electrochemically reacting said gas stream at the cathode to render said gas stream substantially oxygen free; collecting and removing the reacted gas stream from the cathode compartment; passing said substantially oxygen free gas stream into the anode compartment of the fuel cell; circulating the gas stream over the fuel cell anode; and electrochemically reacting the hydrogen.

9. A process according to claim 8 in which said oxygen selective catalyst consists of cobalt oxide.

10. A process according to claim 8 in which is added the steps of passing an ignition hydrogen charge through said anode compartment during startup of said cell; passing the substantially oxygen free gas stream after removal from the cathode compartment through a means to remove any residual oxygen in the gas stream and convert said oxygen to water prior to passing said gas stream into said anode compartment.

11. A process according to claim 8 in which is added the steps of passing the substantially oxygen free gas stream after removal from the cathode compartment through a first dehydrating means; passing said dehydrated gas stream through a residual oxygen removal means to remove any remaining oxygen in said gas stream; passing said dehydrated and deoxygenated gas stream through a second dehydrating means; and passing said gas stream after removal from said second dehydrating means into said anode compartment.

12. A process according to claim 10 comprising the further steps of collecting the water produced by reaction of the residual oxygen and the water produced in the fuel cell reaction; decomposing the collected water to hydrogen and oxygen; and passing said hydrogen and oxygen into the cathode compartment of said fuel cell.

13. A process according to claim 8 in which is added the step of passing the substantially oxygen free gas stream after removal from the cathode compartment through a dehydrating means and a residual oxygen removal means to remove any remaining oxygen in said gas stream, and then passing said gas stream into said anode.

14. A process for converting nuclear energy into electrical energy comprising the steps of radiating a water reservoir to produce a hydrogen and oxygen gas stream; collecting and passing the hydrogen and oxygen gas stream into the cathode compartment of an operating fuel cell; selectively reacting the oxygen at the cathode, and collecting and returning the water produced in the fuel cell reaction to said reservoir; collecting and passing residual oxygen and hydrogen gases from said cathode compartment into a combiner to react the residual oxygen with a stoichiometric amount of hydrogen; collecting the water formed by the reaction of hydrogen and oxygen in said combiner and returning said water to said reservoir; passing the substantially oxygen free exit gas stream from the combiner through a dehydrator and returning any water collected at said dehydrator to said reservoir; passing the gas stream exiting from said dehydrator into the anode compartment of the fuel cell; electrochemically oxidizing the hydrogen at the anode.

15. Process for converting into electricity the chemical energy contained in a hydrogen-oxygen mixture comprising passing the hydrogen-oxygen mixture to the oxygen electrode of a fuel cell which is free of catalysts for the chemical conversion of $H_2$–$O_2$ and thereby removing a substantial portion of the oxygen from said mixture by ionization, and thereafter passing the thus oxygen-depleted mixture in contact with the hydrogen electrode of said fuel cell.

No references cited.

ALLEN B. CURTIS, *Primary Examiner.*